US010264430B2

(12) United States Patent
Cha et al.

(10) Patent No.: US 10,264,430 B2
(45) Date of Patent: Apr. 16, 2019

(54) METHOD AND DEVICE FOR PROVIDING SERVICE

(71) Applicant: SAMSUNG ELECTRONICS CO., LTD., Suwon-si (KR)

(72) Inventors: Sang-ok Cha, Suwon-si (KR); Jong-hyun Ryu, Daejeon (KR); Hee-chul Jeon, Suwon-si (KR); Won-young Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 14/169,388

(22) Filed: Jan. 31, 2014

(65) Prior Publication Data

US 2014/0213180 A1 Jul. 31, 2014

(30) Foreign Application Priority Data

Jan. 31, 2013 (KR) .................. 10-2013-0011495
Jul. 18, 2013 (KR) .................. 10-2013-0084928

(51) Int. Cl.
*H04B 5/00* (2006.01)
*H04W 4/80* (2018.01)
(Continued)

(52) U.S. Cl.
CPC ............... *H04W 4/80* (2018.02); *H04L 67/06* (2013.01); *H04N 21/41407* (2013.01);
(Continued)

(58) Field of Classification Search
CPC . H04W 76/023; H04W 72/048; H04W 72/04; H04W 72/0446; H04L 1/1812;
(Continued)

(56) References Cited

U.S. PATENT DOCUMENTS 7,356,575 B1 4/2008 Shapiro
8,443,042 B2 5/2013 Yamamoto
(Continued)

FOREIGN PATENT DOCUMENTS

CN 1917664 A 2/2007
CN 101304354 A 11/2008
(Continued)

OTHER PUBLICATIONS

Communication dated Aug. 19, 2014 issued by the European Patent Office in counterpart European Patent Application No. 14152558.4.
(Continued)

*Primary Examiner* — Ajibola A Akinyemi
(74) *Attorney, Agent, or Firm* — Sughrue Mion, PLLC

(57) ABSTRACT

Provided are a method and device for providing service via wireless communication. A device which provides a service includes a wireless communication unit which receives, from an external device, information about at least one content that is being reproduced by the external device; and a controller which is configured to request an object for using a service related to the at least one content from a server, and to receive the object from the server, and to output the object via an output unit.

25 Claims, 17 Drawing Sheets

(51) Int. Cl.
*H04N 21/414* (2011.01)
*H04N 21/472* (2011.01)
*H04N 21/84* (2011.01)
*H04N 21/4363* (2011.01)
*H04L 29/08* (2006.01)
*H04L 29/06* (2006.01)
*H04W 12/08* (2009.01)

(52) U.S. Cl.
CPC ..... *H04N 21/43637* (2013.01); *H04N 21/472* (2013.01); *H04N 21/84* (2013.01); *H04L 67/38* (2013.01); *H04W 12/08* (2013.01)

(58) Field of Classification Search
CPC ....... H04L 5/001; H04L 5/0051; H04L 63/10; H04L 51/046; H04L 67/10; H04L 67/42
USPC ...................................................... 455/41.1
See application file for complete search history.

(56) References Cited

U.S. PATENT DOCUMENTS

| | | | |
|---|---|---|---|
| 8,447,812 B2 | 5/2013 | Takai et al. | |
| 9,356,795 B2 | 5/2016 | Johnson | |
| 2006/0008256 A1 | 1/2006 | Khedouri et al. | |
| 2006/0218598 A1 | 9/2006 | Casey et al. | |
| 2006/0242259 A1 | 10/2006 | Vallabh et al. | |
| 2007/0174246 A1* | 7/2007 | Sigurdsson | G06F 17/30176 |
| 2007/0287486 A1 | 12/2007 | Machimura et al. | |
| 2008/0209056 A1* | 8/2008 | Choi | H04L 63/0815 709/229 |
| 2008/0212944 A1 | 9/2008 | Khedouri et al. | |
| 2008/0282309 A1 | 11/2008 | Kim et al. | |
| 2009/0144204 A1* | 6/2009 | Hurry | G06Q 20/085 705/71 |
| 2011/0047248 A1 | 2/2011 | Park et al. | |
| 2011/0202583 A1 | 8/2011 | Provencher et al. | |
| 2011/0288946 A1* | 11/2011 | Baiya | G06F 21/10 705/26.1 |
| 2012/0023191 A1* | 1/2012 | Kang | G06F 17/30038 709/217 |
| 2012/0197998 A1 | 8/2012 | Kessel et al. | |
| 2013/0133037 A1* | 5/2013 | Hwang | G06F 17/30058 726/4 |
| 2013/0346631 A1* | 12/2013 | Gandhi | H04N 21/4126 709/248 |
| 2014/0185495 A1* | 7/2014 | Kuchibhotla | H04L 5/001 370/281 |

FOREIGN PATENT DOCUMENTS

| | | |
|---|---|---|
| CN | 101568081 A | 10/2009 |
| CN | 102197386 A | 9/2011 |
| EP | 1 624 619 A1 | 2/2006 |
| JP | 2007-517276 A | 6/2007 |
| JP | 2007293031 A | 11/2007 |
| JP | 200989297 A | 4/2009 |
| JP | 2009-124617 A | 6/2009 |
| JP | 2009-141746 A | 6/2009 |
| JP | 2010-81591 A | 4/2010 |
| JP | 2010-165287 A | 7/2010 |
| KR | 10-2011-0050307 A | 5/2011 |
| KR | 10-2012-0078133 A | 7/2012 |
| WO | 2008047184 A1 | 4/2008 |
| WO | 2008/085844 A1 | 7/2008 |
| WO | 2010/050927 A1 | 5/2010 |

OTHER PUBLICATIONS

International Search Report dated May 14, 2014 issued in International Application No. PCT/KR2014/000735 (PCT/ISA/220/210).
Written Opinion dated May 14, 2014 issued in International Application No. PCT/KR2014/00735 (PCT/ISA/237).
Communication dated Jan. 15, 2018 by the Japanese Patent Office in counterpart Japanese Patent Application No. 2014-15306.
Communication dated Jan. 25, 2018 by the State Intellectual Property Office of P.R. China in counterpart Chinese Patent Application No. 201410045216.X.
Communication dated Aug. 13, 2018 issued by the Japanese Patent Office in Counterpart Japanese Application No. 2014-015306.
Communication dated Oct. 16, 2018, issued by the State Intellectual Property Office of P.R. China in counterpart Chinese application No. 201410045216.X.

* cited by examiner

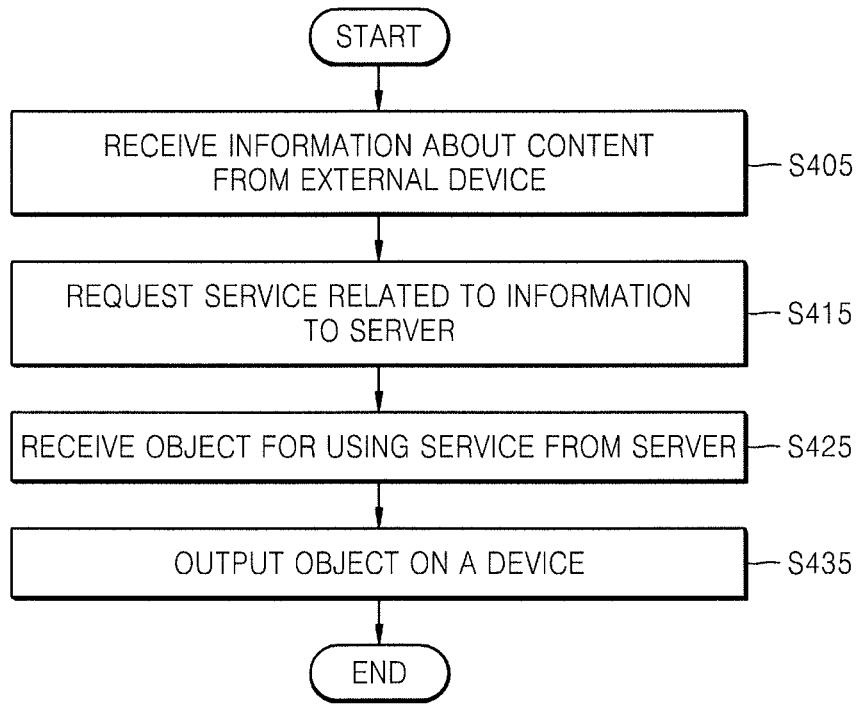
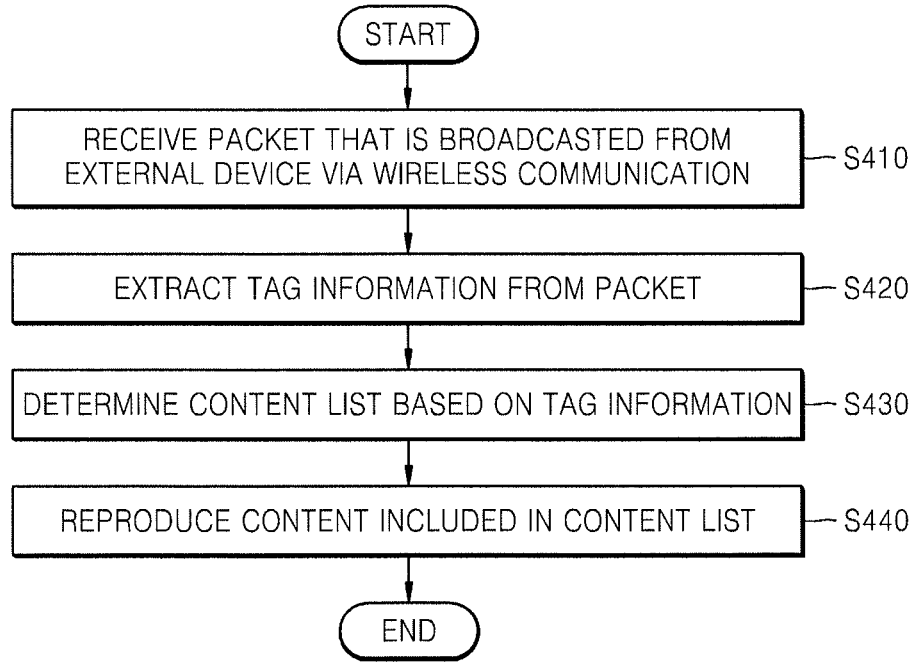

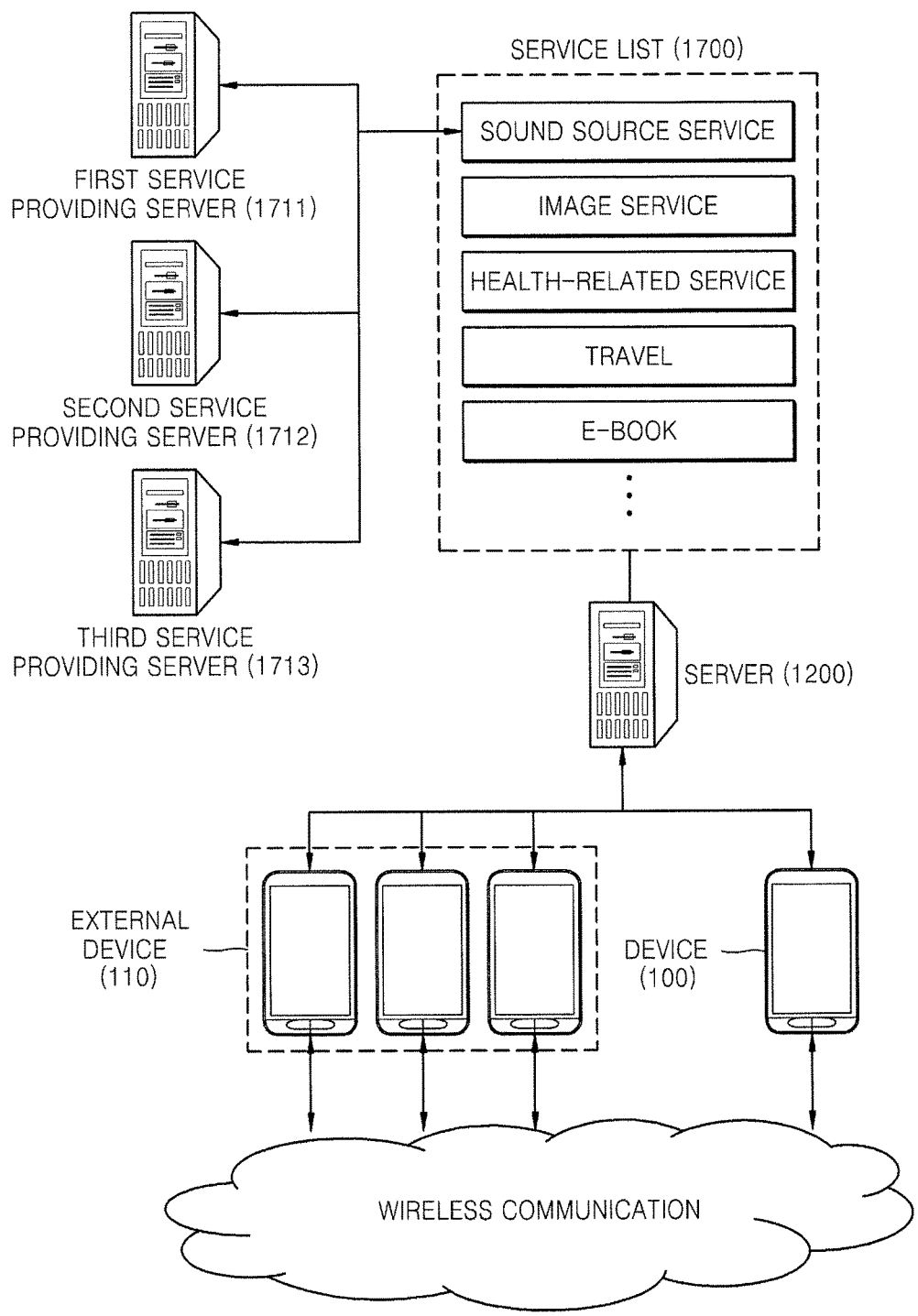

METHOD AND DEVICE FOR PROVIDING SERVICE

CROSS-REFERENCE TO RELATED APPLICATIONS

This application claims priority from Korean Patent Application No. 10-2013-0084928, filed on 18 Jul. 2013, and Korean Patent Application No. 10-2013-0011495, filed on 31 Jan. 2013, in the Korean Intellectual Property Office, the disclosures of which are incorporated herein by reference in their entireties.

BACKGROUND

1. Field

One or more exemplary embodiments relate to a technology of providing services via devices, and more particularly, to a method for providing service via wireless communication and a device which implements the method.

2. Description of the Related Art

As a result of the development of wireless communication technology, a user may be provided with services at various places while moving with a portable device. Accordingly, a device has to provide the user with an appropriate service according to a place where the service is provided or a circumstance of the user. In order for the device to provide the appropriate service according to the place where the service is provided or the circumstance of the user, the device may share content that is reproduced by using a service provided by another device which is in communication with the device.

In particular, when sharing the content reproduced on another device, it is difficult to share the content under copyright.

SUMMARY

One or more exemplary embodiments include a method and device for sharing information which relates to content reproduced on another device adjacent thereto.

One or more exemplary embodiments include a method and device for receiving a service from a service provider that provides the device with services without copyright problems, even if a service provider providing an external device with a service and the service provider providing the device with services are different.

Additional aspects will be set forth in part in the description which follows and, in part, will be apparent from the description, or may be learned by practice of the presented exemplary embodiments.

According to one or more exemplary embodiments, a first device which shares content information with an external device is provided. The first device includes: a wireless transceiver configured to receive, from the external device, information which relates to at least one content that is being reproduced by the external device; a controller configured to request, for a server, an object which relates to using a service which relates to the at least one content, and to receive the object from the server; and an output component configured to output the received object, wherein the controller is further configured to transmit the information which relates to the at least one content to the server in order to request the object, and the received object may include an object that is generated by the server in response to the request.

The controller may be configured to determine, from among a plurality of applications which are installed in the first device, a first application which is usable for reproducing the at least one content, and the information which relates to the at least one content may include information which is usable for identifying the determined first application.

The controller may be further configured to transmit, to the server, information which relates to the plurality of applications which are installed in the first device and to determine the first application by using the server.

The controller may be further configured to identify a service account of a user that has an authorization for using the at least one content, and to request, for the server, an object which relates to using a service configured to facilitate performing a log-in registration for accessing the identified service account.

The information which relates to the at least one content may include tag information which relates to the at least one content.

The wireless transceiver may be further configured to receive a packet which includes the information which relates to the at least one content, the packet may be broadcasted from the external device via near field wireless communication, and the controller may be further configured to extract the information which relates to the at least one content from the received packet.

The information which relates to the at least one content may be inserted into at least one from among a service set identification (SSID) and a vendor specific information element (VSIE) that is broadcasted from the external device via near field wireless communication.

The controller may be further configured to identify a service account of a user that has an authorization for using the at least one content, and if a service account of the user that has the authorization for using the at least one content does not exist, the controller may be further configured to output a user interface for buying a usage authority via the output component.

The object may include a user interface which includes at least one from among an icon, a text, an image, and link information which relates to using the service, and description information which relates to functions of the object.

According to one or more exemplary embodiments, a first device includes: a wireless transceiver configured to receive, from an external device, identification information by which the external device is identifiable; a controller configured to transmit the identification information to a server in order to request an object which relates to using a service which relates to the identification service from the server, and to receive the requested object from the server; and an output component configured to output the received object, wherein the server is configured to match the identification information to at least one content and to store the identification information, and the received object is generated by the server in response to the request.

According to one or more exemplary embodiments, a first device which shares content information with an external device is provided. The first device includes: a wireless transceiver configured to receive, from the external device, information which relates to at least one content that is being reproduced by the external device; a controller configured to generate an object which relates to using a service which relates to the at least one content based on the received information which relates to the at least one content; and an output component configured to output the generated object.

According to one or more exemplary embodiments, a method for sharing content information which is executable by using a first device in conjunction with an external device is provided. The method includes: receiving, from the external device, information which relates to at least one content that is being reproduced by the external device; requesting, from a server, an object which relates to using a service which relates to the at least one content; receiving the object from the server; and outputting the received object to the first device, wherein the requesting the object includes transmitting the information which relates to the at least one content to the server, and the received object includes an object which is generated by the server in response to the request.

The method may further include determining, from among a plurality of applications which are installed in the first device, and based on the information received from the external device, a first application which is usable for reproducing the at least one content, wherein the requesting the object may include transmitting, to the server, information which is usable for identifying the determined first application.

The service may be provided via the application.

The requesting the object may include identifying a service account of a user that has an authorization for using the at least one content, and requesting, from the server, an object which relates to using a service configured to facilitate performing a log-in registration for accessing the identified service account.

The information which relates to the at least one content may include tag information which relates to the at least one content.

The receiving the information which relates to the at least one content may include: receiving a packet which is broadcasted from the external device via near field wireless communication; and extracting the information which relates to the at least one content from the received packet.

The information which relates to the at least one content may be inserted into at least one from among a service set identification (SSID) and a vendor specific information element (VSIE) that is broadcasted from the external device via near field wireless communication.

The method may further include: identifying a service account of a user that has an authorization for using the at least one content; and if a service account of the user that has the authorization for using the at least one content does not exist, outputting a user interface for buying a usage authority via an output component.

The object may include a user interface which includes at least one from among an icon, a text, an image, and link information which relates to using the service, and description information which relates to functions of the object.

According to one or more exemplary embodiments, a method for sharing content information with an external device by using a first device is provided. The method includes: receiving, from the external device, identification information by which the external device is identifiable; transmitting, to a server, the identification information in order to request an object which relates to using a service which relates to the identification information; receiving the requested object from the server; and outputting the received object via an output component, wherein the server is configured to match the identification information to at least one content and to store the identification information, and the received object is generated by the server in response to the request.

According to one or more exemplary embodiments, a method for sharing content information with an external device by using a first device is provided. The method includes: receiving information which relates to at least one content that is being reproduced by the external device; generating an object which relates to using a service which relates to the at least one content based on the received information which relates to the at least one content; and outputting the generated object.

According to one or more exemplary embodiments, a transitory or non-transitory computer-readable recording medium may have embodied thereon a program for executing the method described above.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a flowchart which illustrates processes for sharing content information via a device, according to an exemplary embodiment;

FIG. 5 is a flowchart which illustrates processes for reproducing content by using tag information in a device, according to an exemplary embodiment;

FIG. 19 is a diagram of a system for providing a device with a service by using shared tag information, according to an exemplary embodiment.

DETAILED DESCRIPTION

Figure 1:
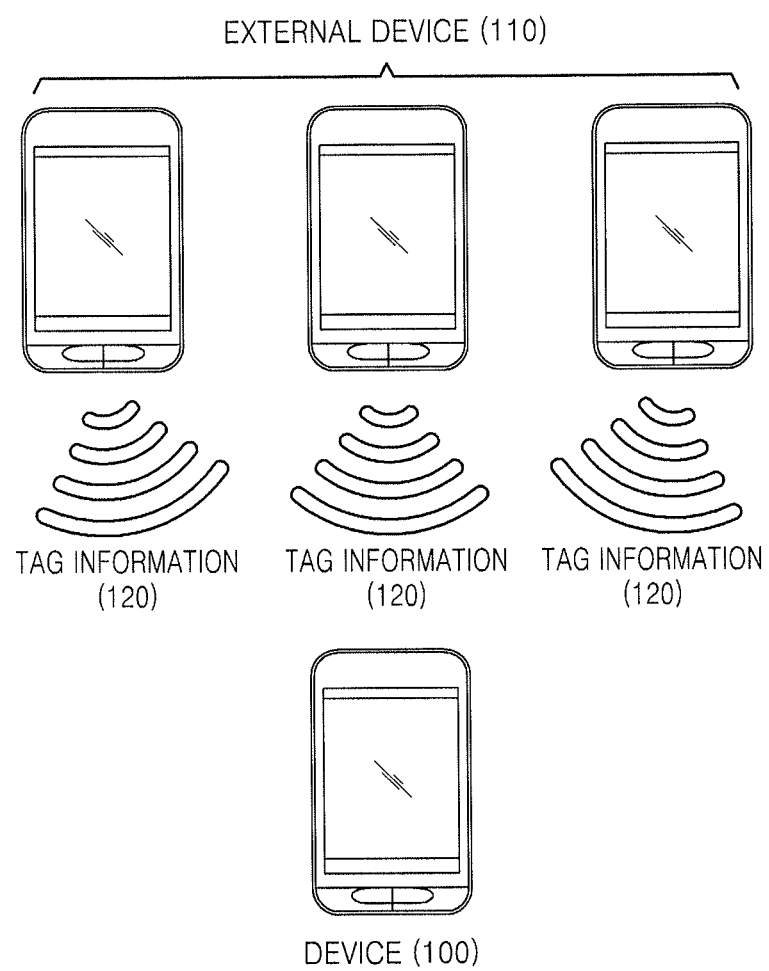
FIG. 1 is a diagram which schematically illustrates a structure which is configured for sharing content information, according to an exemplary embodiment.

The present inventive concept now will be described more fully hereinafter with reference to the accompanying drawings, in which illustrative exemplary embodiments are shown. This present inventive concept may, however, be embodied in many different forms and should not be construed as limited to the exemplary embodiments set forth herein; rather, these exemplary embodiments are provided so that this disclosure will be thorough and complete, and will fully convey the scope of the present inventive concept to those skilled in the art. Like numbers refer to like elements throughout.

It will be understood that although the terms "first" and "second" are used herein to describe various elements, these elements should not be limited by these terms. These terms are only used to distinguish one element from another element.

Throughout the specification, when an element is referred to as being "connected" or "coupled" to another element, it may be "directly connected or coupled" to the other element or "electrically connected or coupled" with intervening elements. When an element is "connected" or "coupled" to another element, it means that the element may communicate with the other element through signal transmission and reception.

When a part "includes" or "comprises" an element, unless there is a particular description contrary thereto, the part may further include other elements.

Most of the terms used herein are general terms that are widely used in the technical art to which the present inventive concept pertains. However, some of the terms used herein may be created to reflect intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present specification.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Throughout the specification, an 'application' refers to a computer program devised to perform specific operations based on a connection between devices that will be described later. For example, the application may include any one or more of a game application, an instrument playing application, a moving image reproduction application, a music reproduction application, a map application, a broadcasting application, an exercise support application, a medical application, a payment application, a transportation mode (for example, a car, a bus, an airplane, or a ship) automatic navigation application, a peripheral device control application, and the like.

Throughout the specification, an ad-hoc mode wireless local area network (LAN) and an infrastructure mode wireless LAN are examples of a communication mode identified according to whether a relay is used during short distance communication between devices. In particular, the ad-hoc mode wireless LAN is an example of a direct communication mode between devices without a relay, and may be a WiFi direct (WFD) communication network. The infrastructure mode wireless LAN is an example of a communication mode between devices through a relay, and may be a WiFi communication network. Thus, the ad-hoc mode wireless LAN throughout the specification is to be understood as being the direct communication mode between devices without any relay, and the infrastructure mode wireless LAN throughout the specification is to be understood as being the communication mode between devices via a relay.

Further, in the present specification, an object which relates to using a service denotes a user interface for using a service of a service provider. The object which relates to using a service may include a user interface for using a service provided from a server or a content provider. The object which relates to using a service may include description information which relates to a user interface which includes, for example, any one or more of icons, text, images, and link information and functions of the object.

Still further, a device may receive an object from the server, and may execute a service provided by the service provider by using the object. The device may acquire contents from an application program in the device, a data source, a server, and a content provider, by using the object. Also, the object may include a user interface in which predetermined services which are provided based on the user or context information of the device are packaged.

In addition, the object may not be separately installed in or executed by the device, but may instead be analyzed by a host program of the device to be displayed on a screen of the device. For example, the object may be realized as a gadget; however, exemplary embodiments are not limited thereto.

According to one or more exemplary embodiments, the object may select a predetermined content based on a user input. The device may be connected to a service for reproducing the content which is selected by a user input to the object. For example, the object may include a play list which includes at least one content. The device may output a preview image of a moving picture which is included in the play list as a cover flow, when outputting the object. However, the object is not limited to the exemplary embodiment.

Hereinafter, exemplary embodiments will be described in detail with reference to accompanying drawings.

FIG. 1 is a schematic diagram of a structure which is configured to sharing content information, according to an exemplary embodiment.

According to the present exemplary embodiment, an external device 110 may transmit information which relates to at least one content reproduced on the external device 110 to a device 100.

For example, the external device 110 may broadcast a packet which includes tag information 120, such as, for example, a title of a song played by the external device 110, via short-range wireless communication. In particular, broadcasting of the packet via short-range wireless communication may refer to transmission of the packet so that an arbitrary device may receive the packet.

In an exemplary embodiment, the packet includes the tag information 120, that is, the tag information 120 is inserted in a field of the packet. For example, the tag information 120 may be inserted into at least one from among a service set identifier (SSID) field in a beacon frame and a vendor specific information element (VSIE) field of IEEE 802.

The tag information 120 may include information which relates to content. In particular, the information about the content denotes information which relates to content provided on the device. For example, if music content is provided on the device, the tag information 120 may include, for example, any one or more of a title, an artist's name, an album's name, and a producer's name of the song played on the device. As another example, if game content is provided on the device, the tag information 120 may include scores which relate to the game content.

Short-range wireless communication is a wireless communication method which is capable of transmitting/receiving data within a relatively short distance. According to the present exemplary embodiment, the device 100 may directly receive the packet which is transmitted from the external device 110, or the device 100 may receive the packet via a repeater. For example, when the external device 110 transmits the tag information 120 to an access point (AP) connected via a wireless fidelity (WiFi) communication method in infrastructure mode, the AP may insert the tag information 120 into an SSID and broadcast the tag information 120. However, the exemplary embodiments are not limited thereto.

If a connection of near field communication between the external device 110 and the device 100 does not include the repeater, the communication between the external device 110 and the device 100 may be performed by using a direct communication method. Direct communication between devices denotes that the devices may transmit/receive data directly to/from each other. The direct communication method between the devices may include any one or more of Bluetooth communication, ultra wideband (UW) communication, ZigBee communication, and WiFi direct communication included in wireless LAN communication in ad-hoc mode. However, the exemplary embodiments are not limited to the above examples. That is, the direct communication method between devices may be referred to as any one or more of a machine-to-machine (M2M) communication method, a device-to-device (D2D) communication method, and a peer-to-peer (P2P) communication method.

The device 100 may receive information about content from at least one external device 110. The device 100 which receives the information about the content may provide a user with the content by using the information about the content. In particular, the device 100 requests, from the server, an object which relates to using the service providing the content, and may receive the object for using the service from the server. The device 100 displays the object for using the service, and may provide the user with the service by using the displayed object.

For example, the device 100 may receive the tag information 120 that is broadcasted by the external device 110. The device 100 that receives the tag information 120 may provide the user with the content by using the tag information 120. For example, when the device 100 receives the tag information 120 which includes a title of a song, the device 100 may reproduce a sound source corresponding to the title. In particular, the device 100 may transmit, to the server, a request for a sound source reproduction service in order to provide the service of reproducing the sound source, and may receive an object for using the sound source reproduction service.

In the exemplary embodiments, the device 100 and the external device 110 are distinguished by their operations according to the exemplary embodiments, and a device may perform as both the device 100 and the external device 110. In particular, the device 100 may receive the tag information 120, and at the same time, the device 100 may broadcast tag information which includes information about content provided via the device 100.

The device 100 and the external device 110 are capable of performing data transmission. The device 100 and the external device 110 may be the same kind of devices or different kinds of devices. The device 100 and the external device 110 may be any one or more of various devices, for example, mobile phones, smartphones, laptop computers, tablet computers, handheld PCs, electronic book terminals, digital broadcasting terminals, personal digital assistants (PDAs), portable multimedia players (PMPs), navigation systems, and smart televisions (TVs). However, the device 100 and the external device 110 are not limited thereto.

Figure 2:
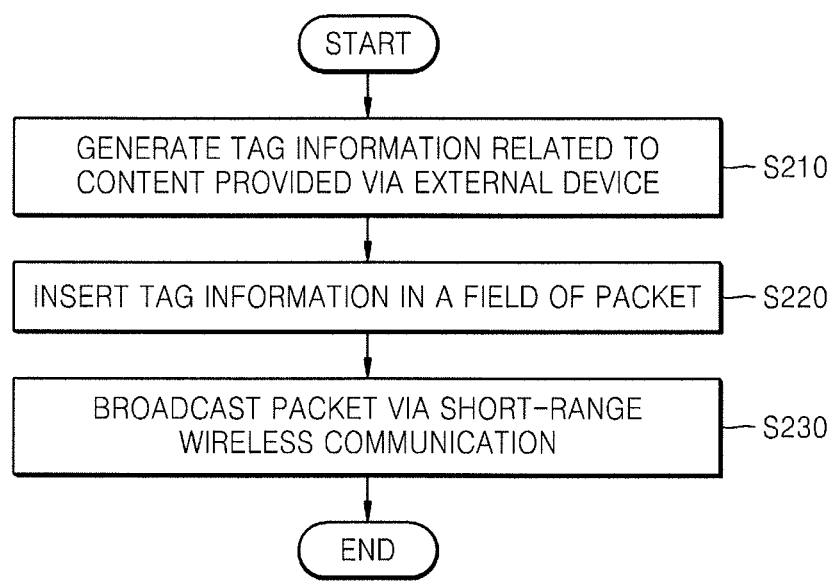
FIG. 2 is a flowchart which illustrates processes for broadcasting content information via a device, according to an exemplary embodiment.

FIG. 2 is a flowchart which illustrates processes for broadcasting content information from the external device 110.

In operation S210, the external device 110 may generate tag information which relates to content provided via the external device 110.

The external device 110 may generate the tag information which relates to the content provided to the user of the external device 110. In particular, the content provided to the user may include any one or more of various contents, for example, movies, music, games, and exercise management services.

For example, if movie content is reproduced on the external device 110, the external device 110 may generate tag information which includes any one or more of a title of the movie, a genre of the movie, and names of actors starring in the movie. In this case, the external device 110 may generate tag information which includes information extracted from metadata of the reproduced movie content.

Then, in operation S220, the external device 110 may insert the tag information in a field of a packet that is transmittable via short-range wireless communication. For example, the tag information may be inserted in an SSID field or a VSIE field.

Then, in operation S230, the external device 110 may broadcast the packet in which the tag information is inserted via short-range wireless communication.

According to the present exemplary embodiment, the device 100 may directly receive the packet which is transmitted from the external device 110, or the device 100 may receive the packet via a repeater. For example, when the external device 110 transmits the tag information to an AP which is connected via a WiFi communication method in infrastructure mode, the AP may insert the tag information in an SSID and broadcast the tag information. However, the exemplary embodiments are not limited thereto.

If a connection of near field communication, short-range communication, or short distance communication between the external device 110 and the device 100 does not include the repeater, the communication between the external device 110 and the device 100 may be performed by using a direct communication method. Direct communication between devices denotes that the devices may transmit/receive data directly to/from each other. The direct communication method between the devices may include any one or more of Bluetooth communication, UWV communication, ZigBee communication, and WiFi direct communication included in wireless LAN communication in ad-hoc mode. However, the exemplary embodiments are not limited to the above examples.

Figure 3:
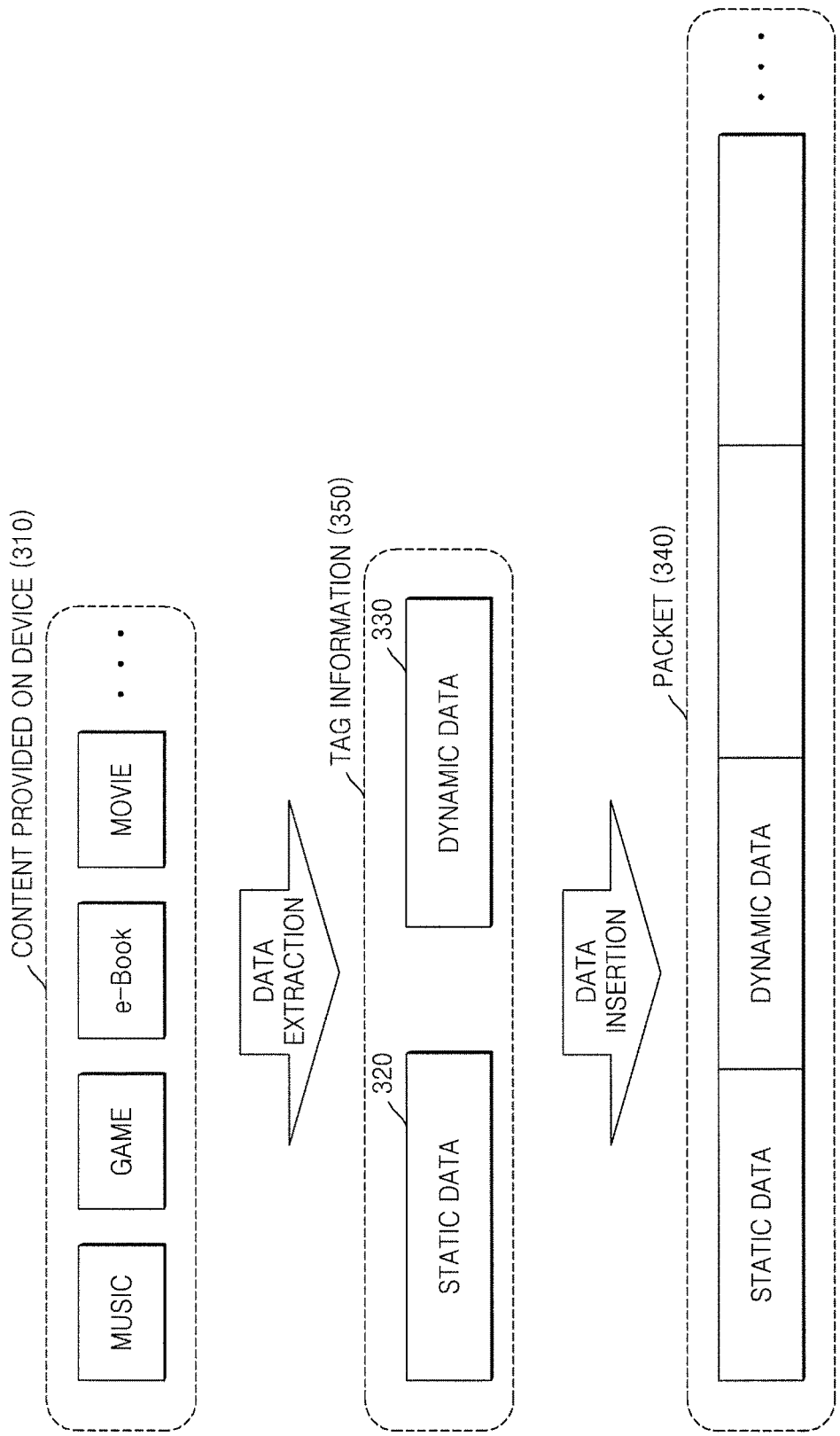
FIG. 3 is a diagram which illustrates processes for inserting tag information including content information in a packet via an external device, according to an exemplary embodiment.

FIG. 3 is a diagram which illustrates processes for inserting tag information which includes content information in a packet via the external device 110, according to an exemplary embodiment.

The external device 110 may generate tag information 350 by extracting data from content 310 which is provided on the external device 110. In particular, the content 310 provided on the external device 110 may include any one or more of various types of content, such as, for example, music content, game content, e-Book content, and movie content.

If the content provided on the external device 110 includes music content, the external device 110 may generate the tag information 350 which includes, for example, any one or more of a title, an artist's name, an album's name, and a producer's name of the song which is playable on the external device 110.

Further, if the content provided on the external device 110 includes game content, the external device 110 may generate the tag information 350 which includes score information of the game provided on the external device 110.

Still further, if the content provided on the external device 110 includes e-Book content, the external device 110 may generate the tag information 350 which includes any one or more of a title, an author, and a genre of the e-Book provided on the external device 110.

In addition, if the content provided on external device 110 includes movie content, the external device 110 may generate the tag information 350 which includes, for example, any one or more of a title, a genre, and actors starring in the movie provided on the external device 110.

However, one or more exemplary embodiments are not limited to the above examples.

According to an exemplary embodiment, the tag information 350 may include static data 320 and/or dynamic data 330.

According to the present exemplary embodiment, the static data 320 may denote data that may be defined based on the content, for example, any one or more of a category of the content, a genre of the content, and information stored in metadata of the content.

Further, according to the present exemplary embodiment, the dynamic data 330 may denote data that may vary based on the user or generation of the tag information, for example, a rank and/or a history of the user using the content.

The tag information 350 may not necessarily include both the static data 320 and the dynamic data 330. The tag information 350 may include one of the static data 320 and the dynamic data 330, or both of them.

The external device 110 may insert the generated tag information 350 in a packet 340 that is broadcasted via short-range wireless communication. In particular, the static data 320 and the dynamic data 330 may be inserted in different fields of the packet 340, according to the present exemplary embodiment.

FIG. 4 is a flowchart which illustrates processes for sharing content information by the device 100, according to an exemplary embodiment.

In operation S405, the device 100 may receive, from an external device, information about at least one content which is reproduced by the external device 110.

In particular, the information about the content may include information that identifies the content. For example, if the content includes music content, the information about the content may include a title of the music. However, the exemplary embodiments are not limited thereto.

According to the present exemplary embodiment, the information about the content may include tag information about the content. For example, the information about the content may include tag information which is extracted from metadata of the content.

According to the present exemplary embodiment, the information about the content may be included in the packet that is broadcasted from the external device 110 via short-range wireless communication. For example, the information about the content may be inserted in an SSID or a VSIE broadcasted from the external device 110, and then transmitted. In this case, the device 100 receives the packet that is broadcasted from the external device 110 via short-range wireless communication, and may extract the information about at least one piece of content from the packet. In the specification, the term 'broadcast' refers to transmission of information or a message from one place or one device to a plurality of devices or an arbitrary device.

Then, in operation S415, the device 100 may request, from a server, a service which relates to the information about the content which is received from the external device 110. For example, if the information about the content includes a title of at least one moving picture, the device 100 may request a service about the moving picture reproduction from the server.

In particular, according to the present exemplary embodiment, when the device 100 requests the service from the server, the device 100 may transmit the information about the content to the server. In response to the request which is received from the device 100, the server may generate an object for using the service which relates to the information about the content. For example, if the server receives the information about content including song titles such as "Arirang" or "Gangnam Style", the server may generate an object which facilitates a capability of the device 100 to reproduce the songs "Arirang" and "Gangnam Style".

Further, according to another exemplary embodiment, the device 100 may determine, from among a plurality of applications which are installed in the device 100, an application which is usable for reproducing the content which is reproduced on the external device 110. In particular, when device 100 requests the service from the server, the device 100 may transmit information about content, which includes information which is usable for identifying a determined application. The server may generate an object for using the service by using an application that may reproduce the content, from among a plurality of applications which are installed in the device 100, based on the information which is usable for identifying the application.

For example, if the external device 110 reproduces the music through "a music playing service 1" by using "a music playing application 1" and the device 100 includes "a music playing application 2" that may provide the user with "a music playing service 2", the server may generate an object for using the music playing service via the "music playing service 2".

Further, according to another exemplary embodiment, the device 100 may identify a service account that has an authorization to use the content reproduced on the external device 110. The device 100 may request, from the server, a service that requires a log-in registration, by using the identified service account.

Figure 14:
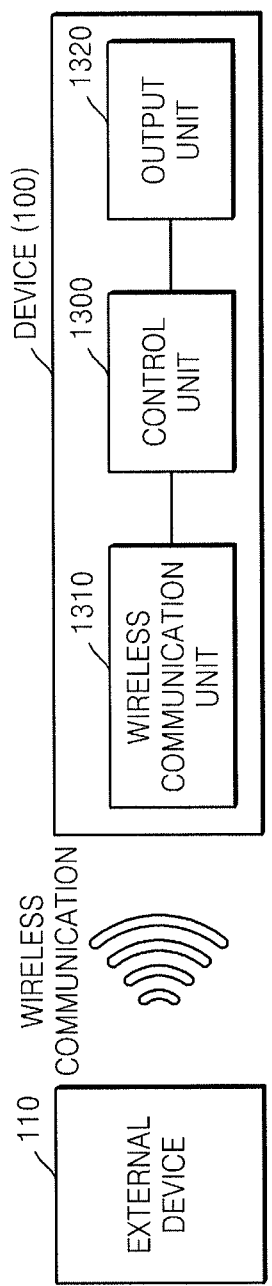
FIG. 14 is a block diagram of a device, according to an exemplary embodiment.

In addition, referring also to FIG. 14, if there is no service account having an authorization to use the content reproduced on the external device 110, the device 100 may output a user interface for buying a usage authority via an output unit (also referred to herein as an "output component") 1320 of the device 100. For example, if the external device 110 reproduces music and the device 100 does not have a service account for reproducing music, the device 100 may output a user interface for buying a usage authority of the lowest price for reproducing the music.

Then, in operation S425, the device 100 receives the object for using the service from the server, and in operation S435, the device 100 outputs the object. The device 100 may provide the user with the service which relates to the information about the content which is received from the external device 110 by using the output object.

According to another exemplary embodiment, the device 100 may receive information which is usable for identifying the external device 110, instead of the information about the content, in operation S405. Then, the device 100 may request a service which relates to the external device 110 from the server in operation S415. In particular, the server may acquire information about content reproduced on the external device 110 or information about the service provided on the external device 110. For example, the external device 110 may periodically update information about the content reproduced on the external device 110 or the service provided on the external device 110 to the server. The server generates an object for reproducing the content reproduced on the external device 110, and transfers the object to the device 100. The device 100 may output the object which is received from the server, and may provide the user with the service by using the output object.

FIG. 5 is a flowchart which illustrates processes for reproducing content by using tag information in the device 100, according to an exemplary embodiment.

In operation S410, the device 100 may receive a packet that is broadcasted from the external device 110 via the wireless communication.

According to the exemplary embodiment, the device 100 may broadcast tag information about the content provided via the device 100 based on a user's selection via short-range wireless communication. According to the present exemplary embodiment, the device 100 may perform operations S410, S420, S430, and S440 in a case in which the tag information is broadcasted. In particular, in order to receive the tag information from the external device 110, the user of the device 100 may broadcast the tag information which is generated from the content reproduced on the device 100.

Then, in operation S420, the device 100 may acquire and/or extract the tag information from the packet.

In particular, the device 100 may decode the packet, and may acquire the tag information which is inserted in a predetermined field of the decoded packet.

In addition, in operation S430, the device 100 may determine a list of contents to be provided based on the acquired tag information.

The device 100 determines the content by analyzing the tag information, and may determine a content list which includes the determined content. For example, if the tag information includes a title of a music album, the device 100 may determine a content list which includes sound sources of the corresponding album.

Then, in operation S440, the device 100 may reproduce the content which is included in the content list. In particular, the device 100 may request, from the server, an object for using the service which corresponds to the content list. The device 100 may reproduce the content by using the object that is received from the server as a response to the request.

The device 100 may share the information about the content reproduced on the external device 110 that is adjacent to the device 100 by reproducing the content based on the tag information which is transmitted via short-range wireless communication.

According to the present exemplary embodiment, the device 100 may transfer the content list to the server, and may receive, from the server, a play list page which is generated based on the content list. The device 100 displays the play list page on the device 100 so that the user may reproduce the content by using the play list page.

According to the present exemplary embodiment, the device 100 may reproduce the content through the service, an account of which is stored in the device 100. For example, in a case in which the external device 110 broadcasts the tag information which is generated from the content reproduced via a first service and the device 100 stores account information for using a second service, the device 100 that receives the tag information may reproduce the content via the second service. In particular, the device 100 may reproduce the content via the service that the user may use in the device 100 without regard to the service through which the content is used in the external device 110.

Further, according to the present exemplary embodiment, the device 100 may determine whether there is an application which is capable of reproducing the content from among a plurality of applications which are installed in the device 100. If there is an application which is capable of reproducing the content, the device 100 may reproduce the content by using the application which is capable of reproducing the content.

Figure 6:
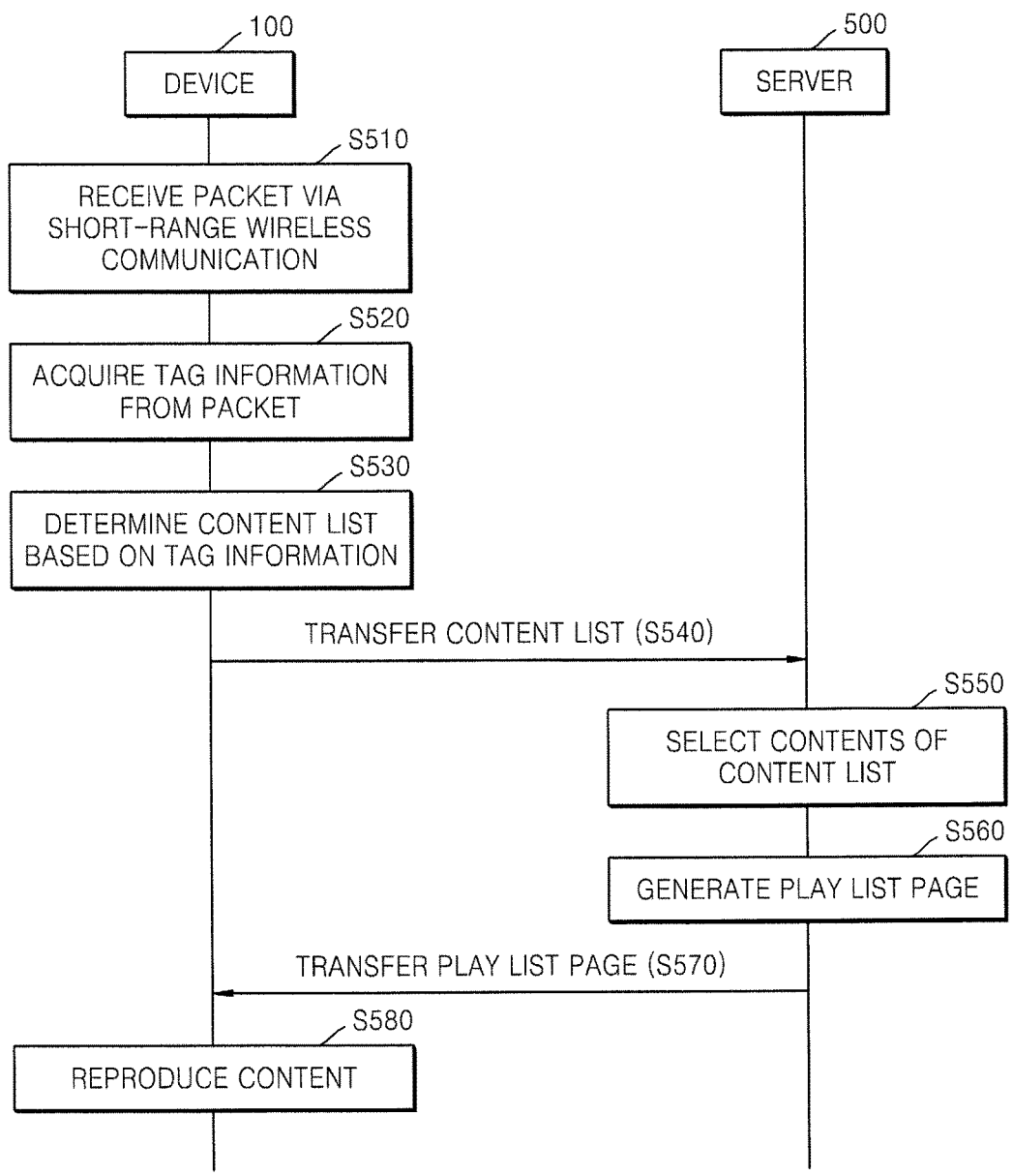
FIG. 6 is a flowchart which illustrates processes for reproducing content by using tag information in a device, according to another exemplary embodiment.

FIG. 6 is a flowchart which illustrates processes for reproducing content by using tag information in the device 100, according to another exemplary embodiment.

In operation S510, the device 100 may receive a packet from the external device 110 via short-range wireless communication. Then, in operation S520, the device 100 may acquire tag information from the packet which is received from the external device 110.

Then, in operation S530, the device 100 determines a content list based on the tag information, and in operation S540, the device 100 transfers the content list to a server 500.

In particular, the server 500 may provide the device 100 with a content recommendation service. The server 500 may directly provide the device 100 with the content, or may recommend content that may be provided from another service providing server.

In operation S550, the server 500 may select contents from the content list which is received from the device 100. In particular, the server 500 may select contents of the content list from among the contents that may be provided to the device 100 from the server, or the contents of the content list from among the contents that may be provided from another service providing server.

Then, in operation S560, the server 500 may generate a play list page for reproducing the contents which were selected in operation S550. Then, in operation S570, the server 500 transfers the play list page to the device 100. In particular, the server 500 may transfer the play list page to the device 100 as link information for connecting to the play list page.

In operation S580, the device 100 may reproduce the contents by using the play list page which is received from the server 500.

Figure 7:
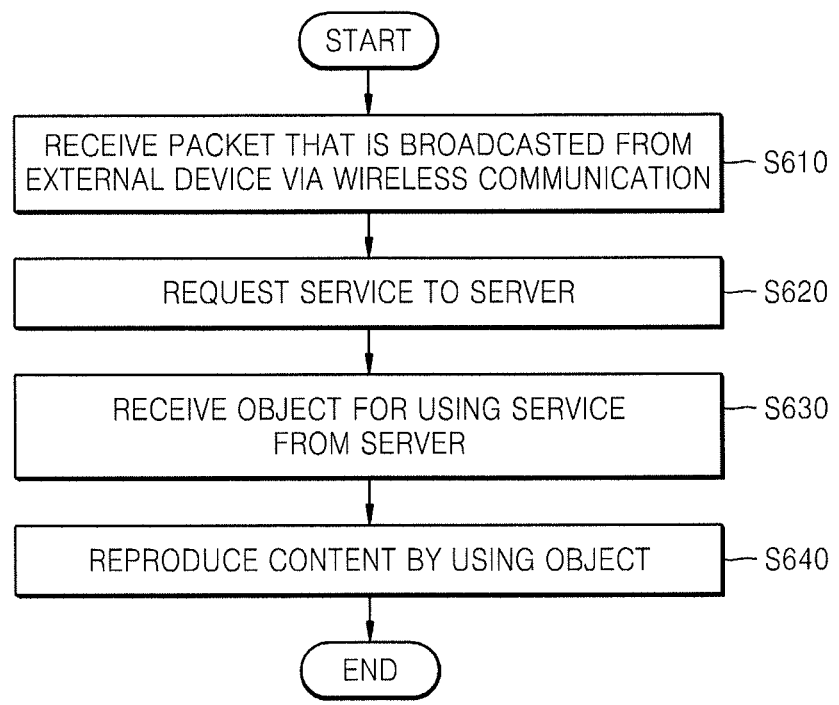
FIG. 7 is a flowchart which illustrates processes for reproducing content by using tag information in a device, according to another exemplary embodiment.

FIG. 7 is a flowchart which illustrates processes for reproducing content by using tag information in the device 100, according to another exemplary embodiment.

In operation S610, the device 100 may receive a packet which is broadcasted from the external device 110 via short-range wireless communication. However, the one or more exemplary embodiments are not limited to the packet being broadcasted via short-range wireless communication.

According to the present exemplary embodiment, the device 100 may broadcast tag information which is generated from the content provided on the device 100 based on a user selection, via short-range wireless communication. In particular, the device 100 may perform operations S410 through S440 when the tag information is broadcasted. Accordingly, in order to receive the tag information from the external device 110, the user of the device 100 may broadcast the tag information which is generated from the content reproduced on the device 100.

Then, the device 100 acquires the tag information from the packet, and in operation S620, the device 100 may request, from the server, a service which is related to the tag information. In conjunction with submitting the request, the device 100 may transfer the tag information to the server. In addition, in operation S630, the device 100 may receive an object for using the service, which is generated based on the tag information, from the server. Then, in operation S640, the device 100 may reproduce the content by using the received object.

According to the present exemplary embodiment, the device 100 may receive a play list page for reproducing the contents from the server. The device 100 may display the play list page, and may reproduce the contents by using the displayed play list page.

Figure 8:
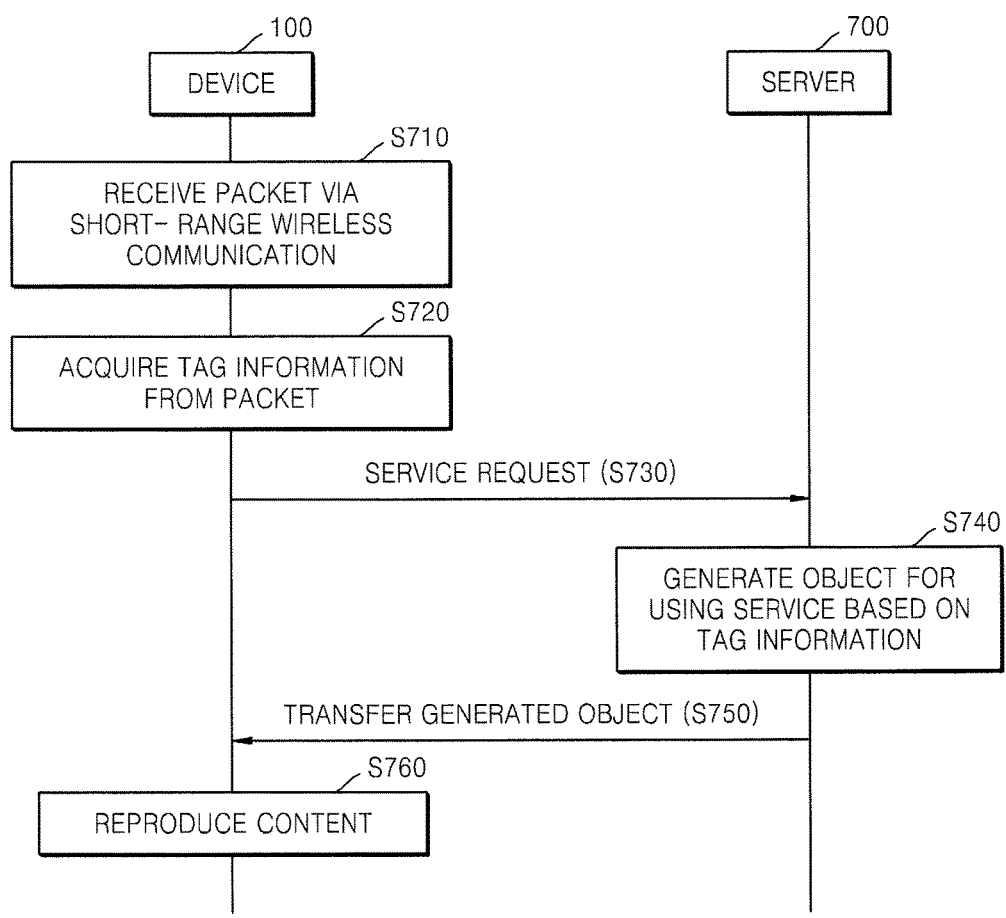
FIG. 8 is a flowchart which illustrates processes for reproducing content by using tag information in a device, according to another exemplary embodiment.

FIG. 8 is a flowchart which illustrates processes for reproducing content by using tag information in the device 100, according to another exemplary embodiment.

In operation S710, the device 100 receives a packet that is broadcasted from the external device 110, and in operation S720, the device 100 acquires tag information from the received packet. In particular, a server 700 may provide the device 100 with a content recommendation service. The server 700 may directly provide the device 100 with contents, or may recommend the contents that may be provided from another service-providing server.

Then, in operation S730, the device 100 may request, from the server 700, a service which is related to the tag information. In conjunction with this operation, the device 100 may transfer the tag information to the server 700.

In operation S740, the server 700 that receives the request for the service from the device 100 may generate an object for using the service based on the tag information which is received from the device 100. In particular, the server 700 may determine a content list that will be reproduced by using the object by directly analyzing the tag information, or may request a content list corresponding to the tag information from another server.

According to the present exemplary embodiment, the object for using the service may include a play list page for reproducing the contents.

Then, in operation S750, the server 700 may transfer the object to the device 100. Then, in operation S760, the device 100 may reproduce the contents by using the received object.

Figure 9:
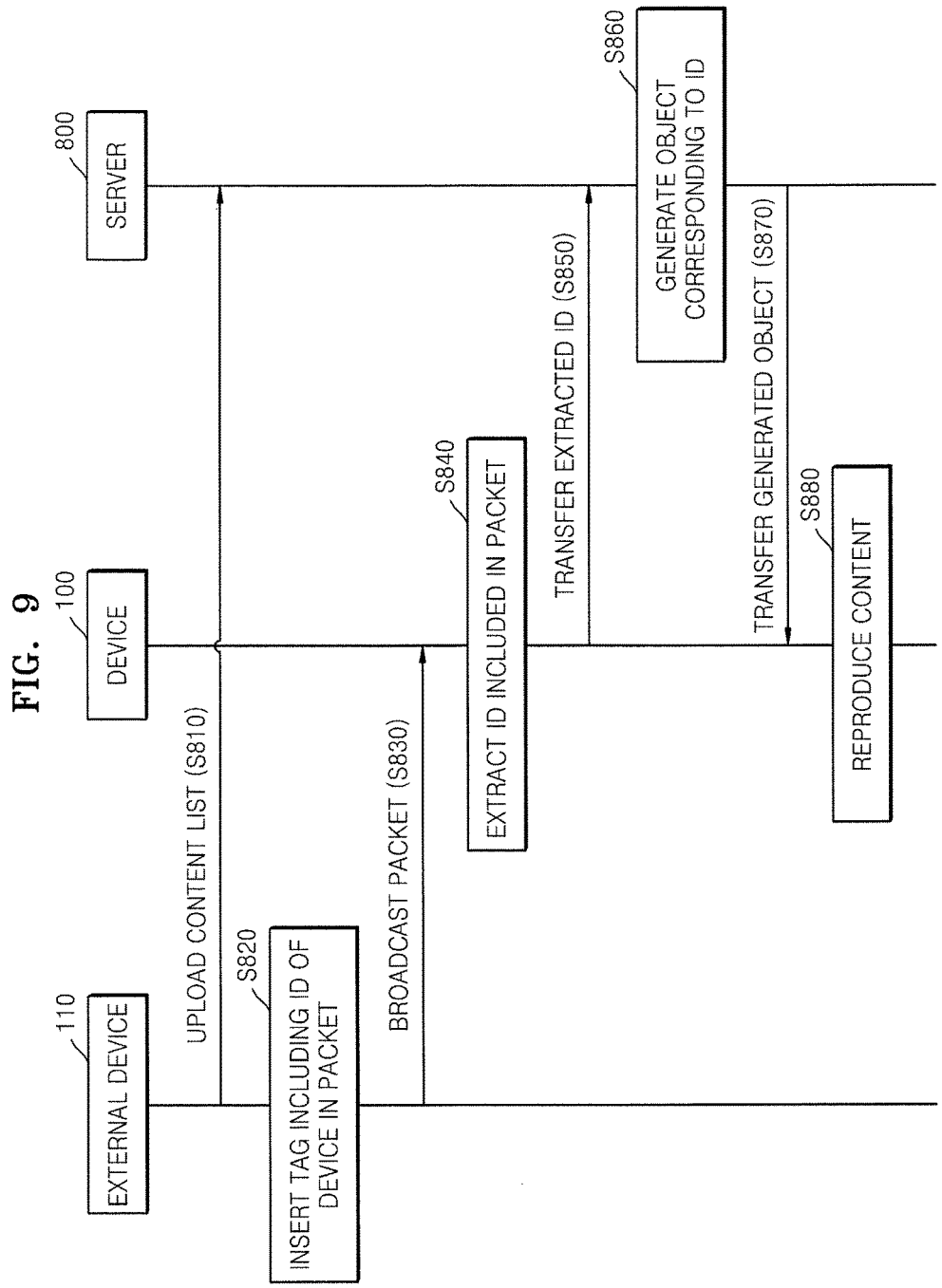
FIG. 9 is a flowchart which illustrates processes for reproducing content by using tag information in a device, according to another exemplary embodiment.

FIG. 9 is a flowchart which illustrates processes for reproducing content by using tag information in the device 100, according to another exemplary embodiment.

In operation S810, the external device 110 may upload content information to a server 800. In particular, the content information may include information which relates to the content provided on the external device 110.

In addition, the content information may be matched to an identifier (ID) of the external device 110, and then, may be uploaded to the server 800. In an exemplary embodiment, the ID of the external device 110 denotes identification information which is usable by the server 800 for identifying the external device 110. The ID of the external device 110 may be registered in the server 800.

Then, in operation S820, the external device 110 inserts tag information, including the ID of the external device 110, in a packet, and in operation S830, the external device 110 broadcasts the packet in which the tag information is inserted via short-range wireless communication.

In operation S840, the device 100 receives the packet broadcasted from the external device 110, and extracts the ID of the external device 110 which is included in the packet. In addition, in operation S850, the device 100 may transmit the ID of the external device 110 to the server 800.

According to the present exemplary embodiment, the device 100 may request, from the server 800, a service which corresponds to the ID of the external device 110 in operation S850.

In operation S860, the server 800 may generate an object for using the service which corresponds to the ID of the external device 110. The server 800 may determine a content list which corresponds to the ID directly, or may request a content list from another server.

In operation S870, the server 800 may transfer the generated object to the device 100. In addition, the server 800 may transfer the content to be reproduced to the device 100, according to one or more exemplary embodiments. The object generated by the server 800 may include a play list page for reproducing the content.

In operation S880, the device 100 may reproduce the content by using the object for using the service.

Figure 10:
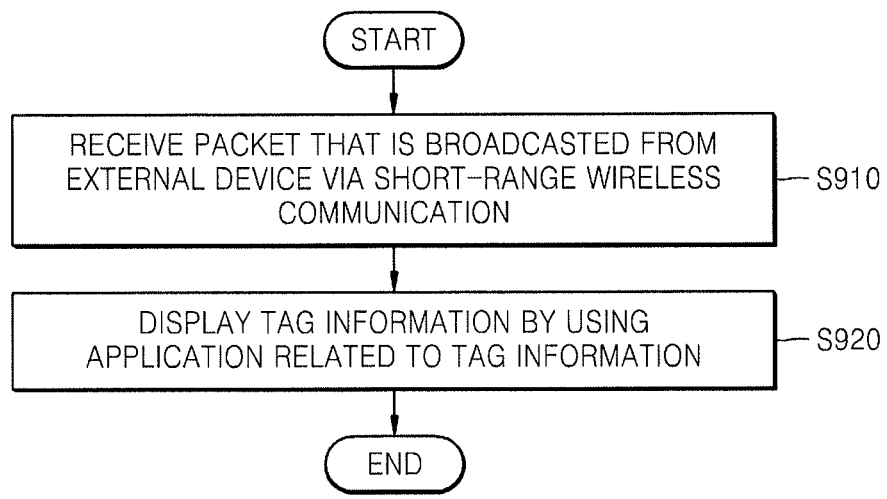
FIG. 10 is a flowchart which illustrates processes for displaying tag information, according to an exemplary embodiment.

FIG. 10 is a flowchart which illustrates processes for displaying tag information, according to an exemplary embodiment.

In operation S910, the device 100 may receive a packet which is broadcasted from the external device 110 via short-range wireless communication.

In particular, the tag information may be inserted into an SSID or a VSIE which is broadcasted from the external device 110 via the short-range wireless communication.

According to the present exemplary embodiment, the device 100 may broadcast tag information which is generated from the content provided on the device 100 based on the user's selection via short-range wireless communication. In particular, the device 100 may perform operations S910 and S920 only when the tag information is broadcasted. In this aspect, in order to receive the tag information from the external device 110, the user of the device 100 must broadcast the tag information which is generated from the content reproduced on the device 100.

Then, in operation S920, the device 100 may display the tag information by using an application which is related to the tag information.

According to the present exemplary embodiment, the device 100 transmits the tag information to a server, and may receive and display a page generated based on the tag information from the server. In particular, the page generated based on the tag information denotes a page for providing a service by using the tag information. For example, if the tag information includes record of an exercise amount of the user of the external device 110, the device 100 may receive and display a page for providing an exercise amount comparing service with other users which are relatively proximal to the device.

Figure 11:
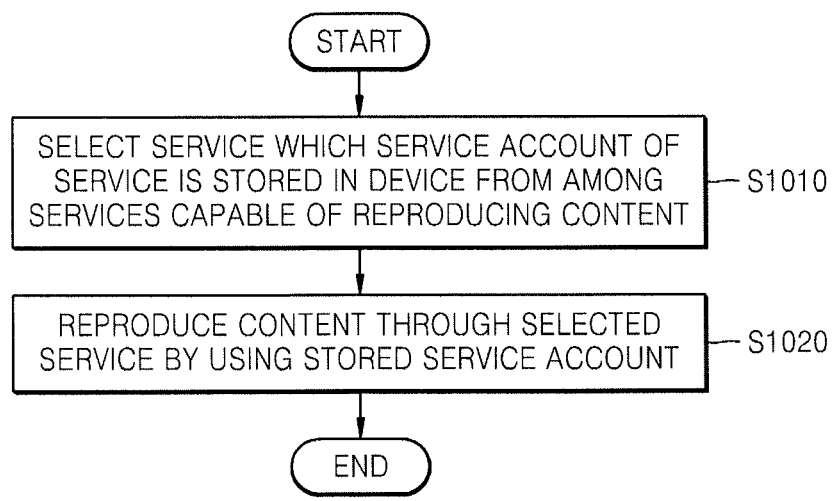
FIG. 11 is a flowchart which illustrates processes for reproducing content on a device, according to an exemplary embodiment.

FIG. 11 is a flowchart which illustrates processes for reproducing content on the device 100, according to an exemplary embodiment.

In operation S1010, the device 100 may select a service, for which a service account is stored in the device 100, from among a plurality of services for reproducing the content.

According to one or more exemplary embodiments, the device 100 may select a service that is set in advance, unlike operation S1010, and one or more exemplary embodiments are not limited thereto.

In operation S1020, the device 100 may perform a log-in registration in order to access the service as the stored service account, and may reproduce the content via the selected service.

When the device 100 reproduces the content by using the service that is available in the device 100 by using the tag information which is received from the external device 110, the device 100 may share the information about the content used by the external device 110 without regard to the kind of the service used by the external device 110.

Figure 12:
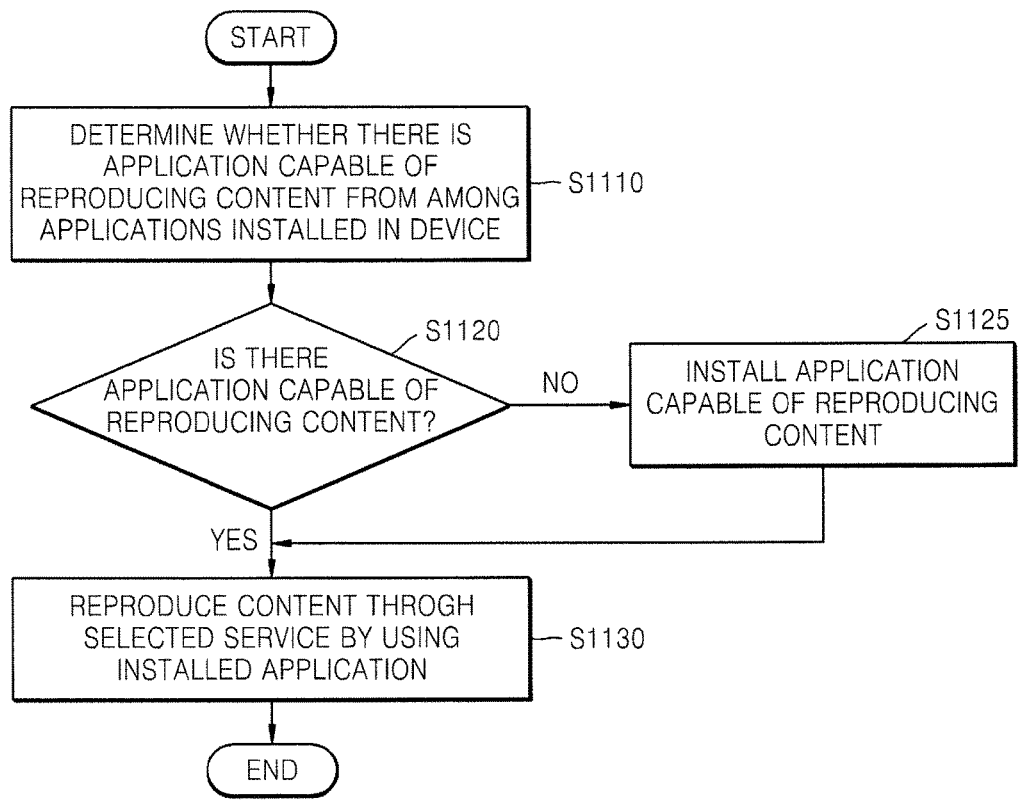
FIG. 12 is a flowchart which illustrates processes for reproducing content on a device, according to another exemplary embodiment.

FIG. 12 is a flowchart which illustrates processes for reproducing content on the device 100, according to another exemplary embodiment.

In operation S1110, the device 100 may determine whether there is an application that is usable for reproducing the content included in a content list, from among a plurality of applications which are installed in the device 100.

For example, if the content included in the content list includes movie content, the device 100 may determine whether there is an application that is capable of reproducing moving pictures in the device 100.

According to another exemplary embodiment, the device 100 may determine whether there is an application which is related to the tag information acquired from the external device 110. For example, if the tag information includes a game result score which is related to game content, the device 100 may determine whether there is a game application for displaying the score in the device 100.

If a determination is made in operation S1120 that there is no application for reproducing the content on the device 100, then in operation S1125, the device 100 may install the application for reproducing the content. Then, in operation S1130, the device 100 may reproduce the content by using the installed application.

If a determination is made in operation S1120 that there is an application for reproducing the content on the device 100, then in operation S1130, the device 100 may reproduce the content by using the application.

Figure 13:
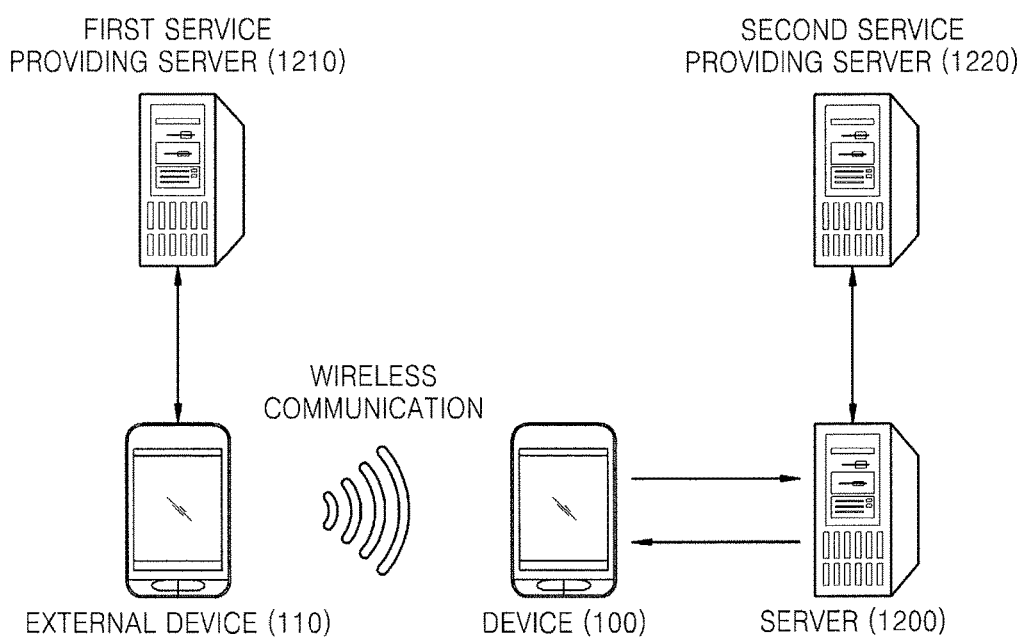
FIG. 13 is a block diagram of a system for sharing content information, according to another exemplary embodiment.

FIG. 13 is a block diagram of a system which is configured for sharing content information, according to an exemplary embodiment.

According to the present exemplary embodiment, the external device 110 may provide the user with content via a service which is provided by a first service providing server 1210. In addition, the external device 110 may broadcast tag information which includes information about the content provided to the user via the wireless communication.

The device 100 may receive the tag information broadcasted from the external device 110. The device 100 may directly analyze the tag information in order to provide the user with the content, or may request content from a server 1200.

According to the exemplary embodiment, the device 100 may transmit the tag information to the server 1200.

The server 1200 that receives the request for the content may generate a content list and/or a page for using the service related to the tag information, and may provide the device 100 with the content list and/or the page.

The server 1200 may provide the content directly to the device 100, or may provide the device 100 with the content via a second service providing server 1220 which is configured for providing the device 100 with the service.

If the server 1200 does not directly provide the content to the device 100, the server 1200 may store information about the service that may be used by the device 100. In particular, the server 1200 may identify the second service providing server 1220 based on information about services that are available to the device 100, and may request the content from the second service providing server 1220.

FIG. 14 is a block diagram of the device 100, according to an exemplary embodiment.

The device 100 according to the present exemplary embodiment may include a wireless communication unit (also referred to herein as a "wireless transceiver") 1310 which is configured to perform wireless communication, an output unit (also referred to herein as an "output component") 1320 which is configured to output content, and a control unit (also referred to herein as a "controller") 1300 which is configured to control the components.

The wireless communication unit 1310 may receive information about at least a piece of content which is reproduced by the external device 110.

According to the present exemplary embodiment, the wireless communication unit 1310 may receive a packet broadcasted from the external device 110 via short-range wireless communication.

In addition, the wireless communication unit 1310 may broadcast information which relates to content reproduced on the device 100, after receiving the packet.

The output unit 1320 may output content, such as, for example, any one or more of images and/or sounds. For example, the output unit 1320 may include a display device, such as, for example, a liquid crystal display (LCD), and/or a sound reproduction device, such as, for example, a speaker.

The control unit 1300 may request, from a server, a service which relates to the information received via the wireless communication unit 1310, may receive an object for using the service, and may output the object via the output unit 1320.

According to the present exemplary embodiment, the control unit 1300 acquires tag information from the packet, requests a service which relates to the tag information from the server, and may output the object which is received in response to the service requested from the server via the output unit 1320.

In particular, the tag information may include information which relates to at least one piece of content provided on the external device 110.

According to the present exemplary embodiment, the control unit 1300 may reproduce the content by using the service, an account of which is stored in the device 100.

Further, according to the present exemplary embodiment, the control unit 1300 may determine whether there is an application for reproducing the content from among a plurality of applications, and may reproduce the content by using the thusly determined application for reproducing the content.

According to the present exemplary embodiment, the device 100 transmits a content list to the server via the wireless communication unit 1310, and may receive, from the server, a play list page which is generated based on the information about the content. In particular, the play list page denotes a page for reproducing the content.

According to another exemplary embodiment, the control unit 1300 transmits the information about the content included in the packet transmitted via the wireless communication unit 1310, and may receive the content list generated based on the information about the content from the server. The control unit 1300 may reproduce the content included in the content list via the output unit 1320.

In an exemplary embodiment, the tag information may include an ID of the external device 110 that transmits the packet. In particular, the content list may include the content list which is updated by the external device 110 to the server.

According to another exemplary embodiment, the control unit 1300 may execute the application which is related to the tag information included in the packet transmitted via the wireless communication unit 1310, and may display the tag information via the output unit 1320 by using the application.

In particular, the application related to the tag information may denote an application that may provide the content by using the tag information.

According to the present exemplary embodiment, the device 100 transmits the tag information to the server, and may receive, from the server, a page which is based on the tag information. The output unit 1320 may display the received page. In particular, the page which is generated based on the tag information denotes a page for providing the service by using the tag information. For example, if the tag information includes a game score, a page for displaying the game score may be the page which is generated based on the tag information.

Figure 15:
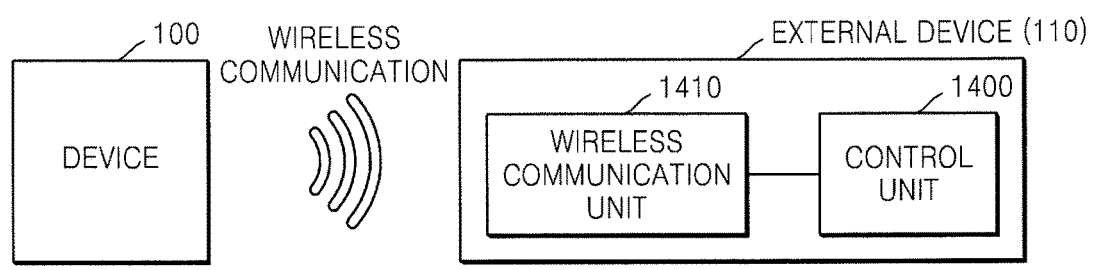
FIG. 15 is a block diagram of an external device, according to an exemplary embodiment.

FIG. 15 is a block diagram of an external device 110, according to an exemplary embodiment.

The external device 110 according to the present exemplary embodiment may include a wireless communication unit (also referred to herein as a "wireless transceiver") 1410 which is configured for performing wireless communication and a control unit (also referred to herein as a "controller") 1400 which is configured for controlling each component in the external device 110.

According to the present exemplary embodiment, the wireless communication unit 1410 may broadcast a packet which includes information about content reproduced on the external device 110 via the wireless communication.

The control unit 1400 may generate tag information which is related to the content provided on the external device 110, and may insert the tag information in a field of the packet that is broadcasted via the wireless communication.

Further, according to the present exemplary embodiment, the tag information may include information which is extracted from metadata of the content provided on the external device 110.

According to another exemplary embodiment, the tag information may include an ID of the external device 110. The external device 110 may upload the information about the content provided on the device 100 to the server, after matching the information to the ID. In particular, the ID includes information which is usable by the server to identify the external device 110.

Figure 16:
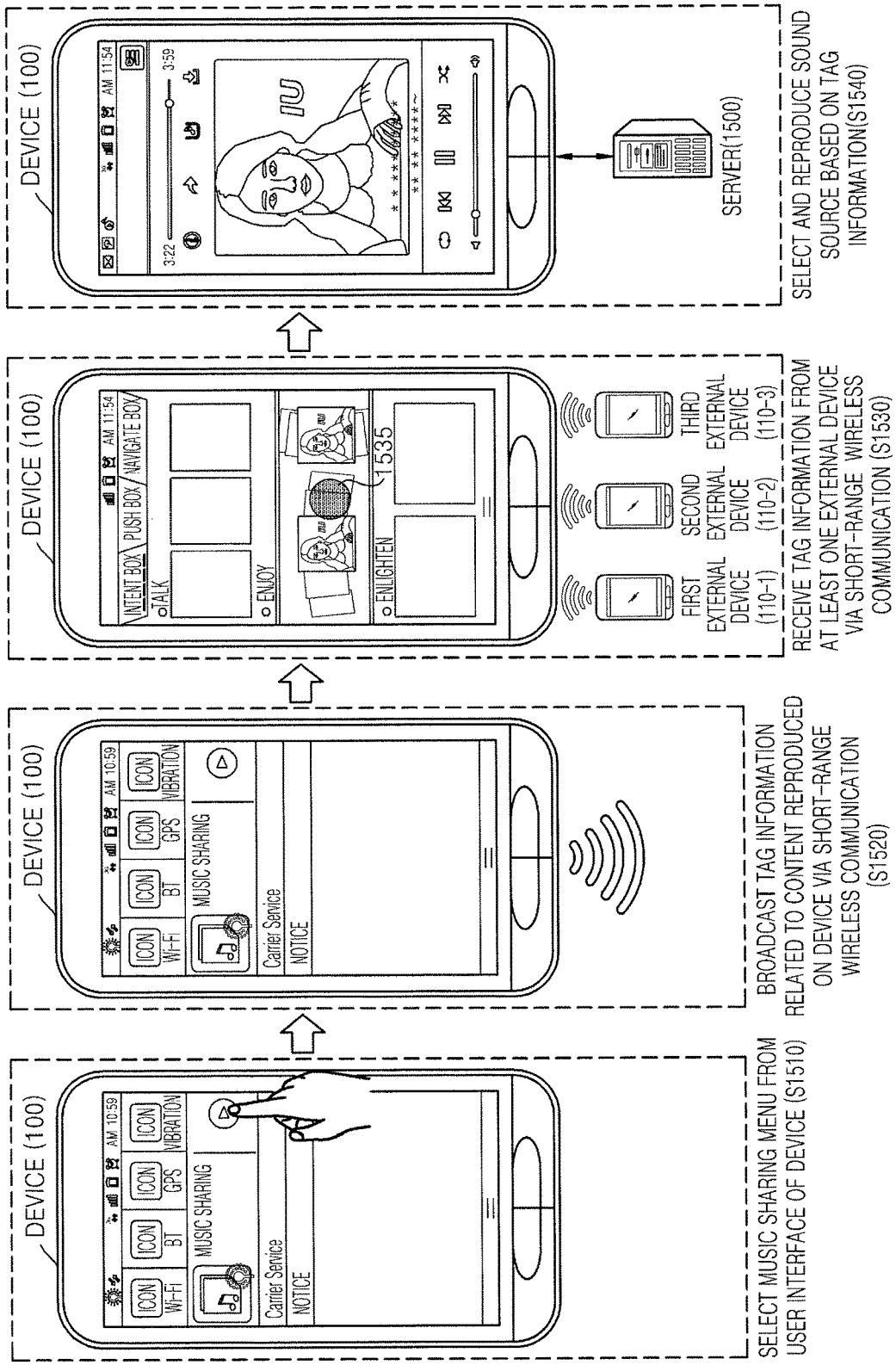
FIG. 16 is a diagram which illustrates an example of sharing content information which relates to music content.

FIG. 16 is a diagram which illustrates an example of sharing content information which relates to music content, according to an exemplary embodiment.

The device 100 may display a user interface for sharing music content with the external device 110 which is adjacent to and/or relatively proximal with respect to the device 100. In operation S1510, the user may select a music sharing menu via the user interface which is displayed on the device 100.

In operation S1520, if the music sharing menu is selected by the user input, the device 100 may broadcast tag information which is related to sound sources reproduced on the device 100 via short-range wireless communication. In particular, the tag information may include any one or more of a title, an artist, and a genre of the music.

In operation S1530, the device 100 may receive tag information from at least one external device adjacent thereto, for example, a first external device 110-1, a second external device 110-2, and/or a third external device 110-3, via short-range wireless communication.

In particular, the device 100 may request the tag information and a service related to the tag information from the server. Then, the device 100 may receive an object 1535 for using the service as a response to the request, and may output the object 1535. In the present exemplary embodiment, the object 1535 may include a user interface which represents a music list. However, one or more exemplary embodiments are not limited thereto.

Then, in operation S1540, the device 100 selects a sound source to be reproduced based on the tag information, and reproduces the selected sound source. The device 100 may receive and reproduce the sound source that will be reproduced via a server 1500.

Figure 17:
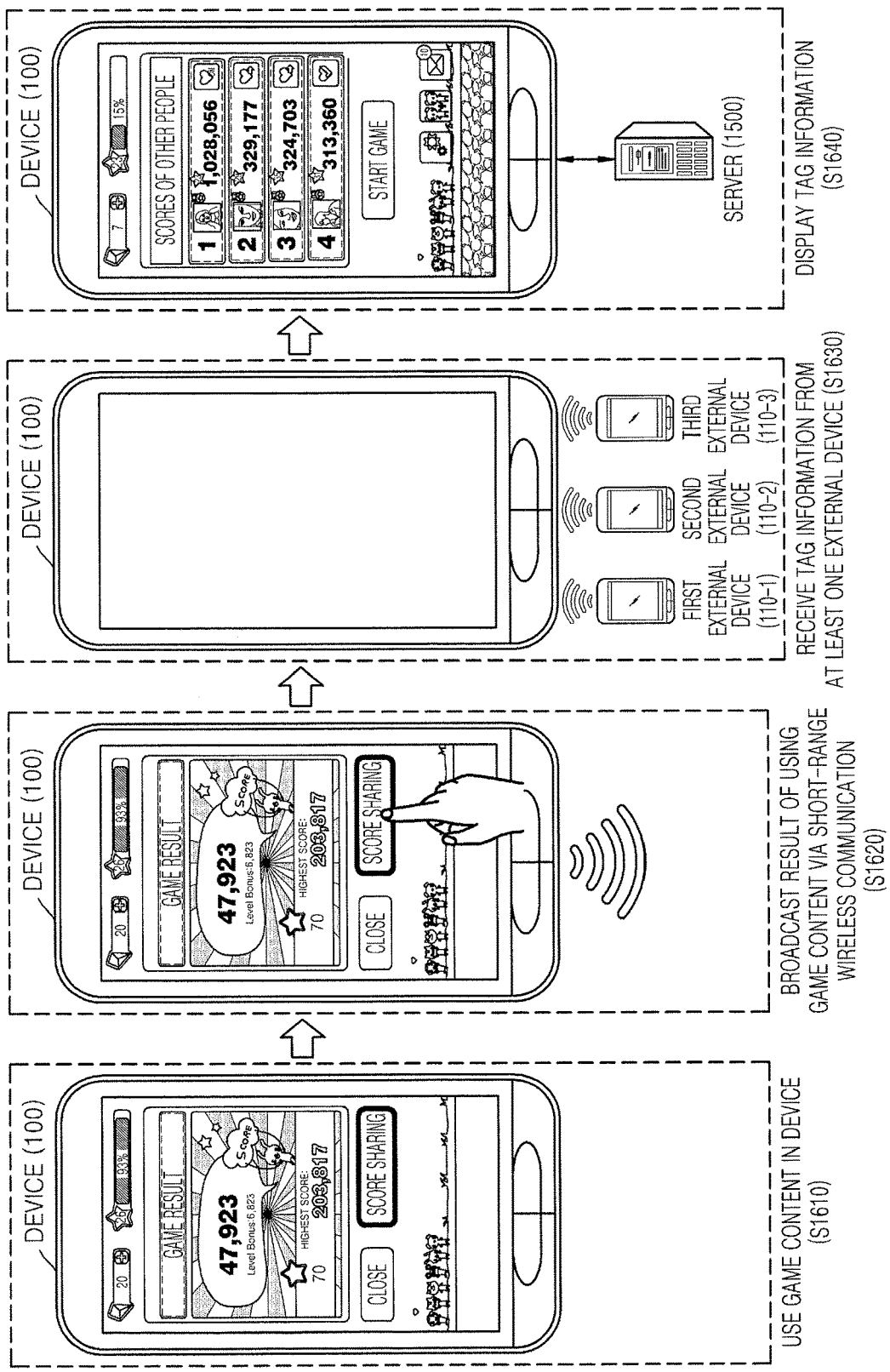
FIG. 17 is a diagram which illustrates an example of sharing content information which relates to game content.

FIG. 17 is a diagram which illustrates an example of sharing content information which relates to game content, according to an exemplary embodiment.

In operation S1610, in a case in which the device 100 provides the user with game content and a menu for sharing a result of using the game content is selected by the user via a user interface, the device 100 may broadcast tag information via short-range wireless communication in operation S1620.

The tag information broadcasted in operation S1620 may include a game score which corresponds to the result of using the game content.

Then, in operation S1630, the device 100 may receive tag information from at least one external device adjacent to the device 100, such as a first external device 110-1, a second external device 110-2, or a third external device 110-3, via short-range wireless communication.

The tag information received in operation S1630 may include a game score which corresponds to the result of using the game content in the first external device 110-1, the second external device 110-2, or the third external device 110-3.

In operation S1640, the device 100 displays the game scores of users of other external devices adjacent to the device 100 based on the tag information.

Figure 18:
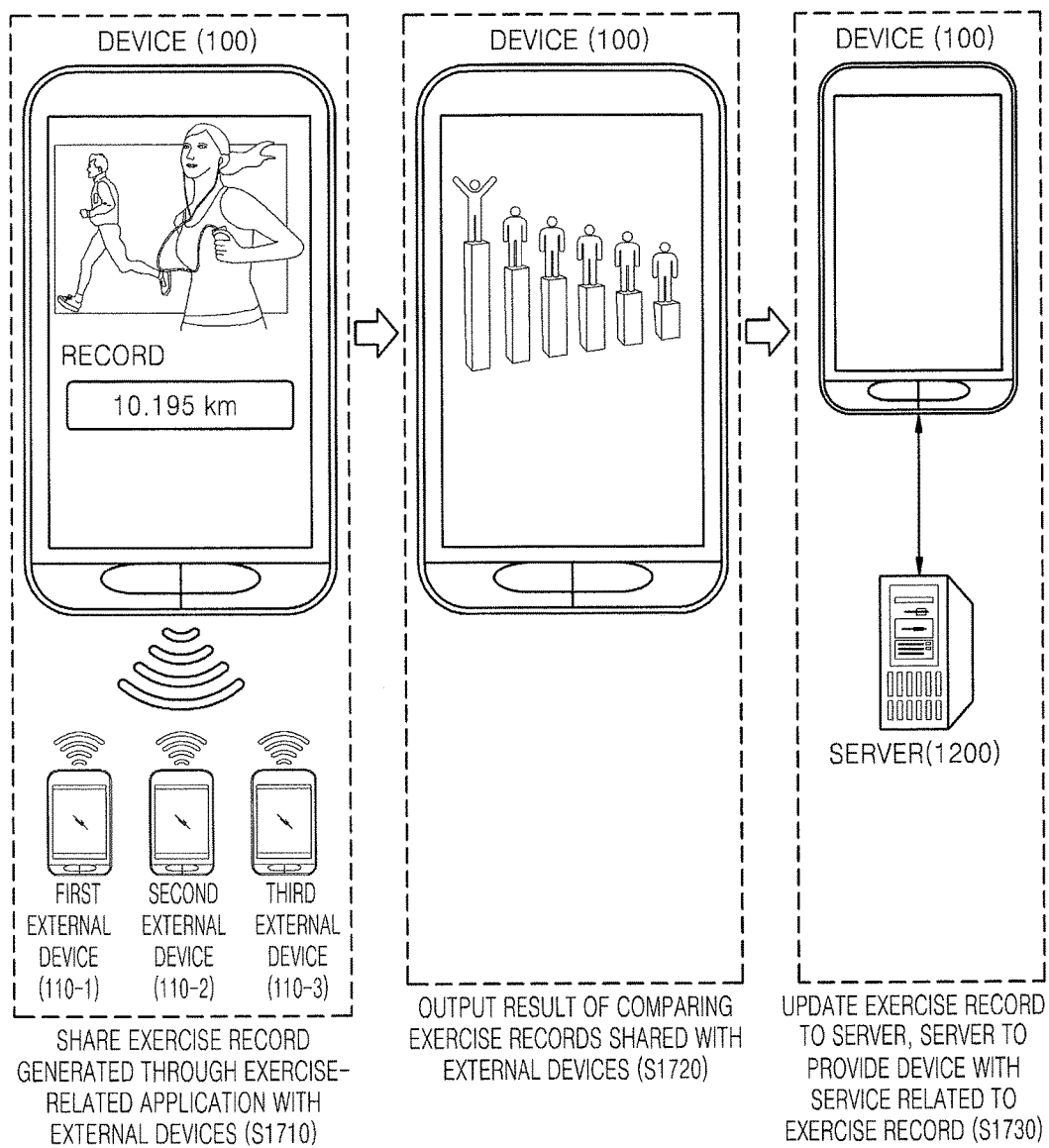
FIG. 18 is a diagram which illustrates an example of sharing content information which relates to exercise content, according to an exemplary embodiment.

FIG. 18 is a diagram which illustrates an example of sharing content information which relates to exercise-related content, according to an exemplary embodiment.

The device 100 may generate an exercise record by using an exercise-related application. For example, when the exercise-related application is executed, the device 100 may generate a moving distance between GPS coordinates received via a GPS receiver provided on the device 100 as the exercise record.

In operation S1710, the device 100 may share the exercise record generated by the exercise-related application with at least one external device adjacent to the device 100, such as a first external device 110-1, a second external device 110-2, or a third external device 110-3.

In operation S1720, the device 100 may output a result of comparing exercise records that are shared with the external device. For example, a rank among the exercise record generated in the device 100 and the exercise records generated in the first, second, and third external devices 110-1, 110-2, and 110-3 may be outputted.

The device 100 may update at least one of the exercise record generated in the device 100 and the exercise records generated in the first, second, and third external devices 110-1, 110-2, and 110-3 to a server 1200. In addition, in operation S1730, the device 100 may be provided with a service which is related to the exercise record from the server 1200. For example, the device 100 may receive, from the server 1200, an exercise recommending service or a health care service, based on the exercise record.

FIG. 19 is a diagram of a system which is configured for providing the device 100 with a service by using shared tag information, according to an exemplary embodiment.

According to the present exemplary embodiment, the device 100 may share the tag information with at least one external device 110 via short-range wireless communication. In particular, the tag information may include information about at least one piece of content provided on the device 100 or the external device 110. For example, the tag information may include information about any one or more of the title, artist, genre, and the like of the music provided on the external device 110.

Further, the tag information may include information about a kind of service provided on the device 100 or the external device 110. The kind of service may denote items for classifying the service provided on the device 100 or the external device 110, such as, for example, any one or more of a sound source providing service, a moving picture service, a health-related service, a travel-related service, and an e-Book service.

The sound source providing service denotes a service which provides the device 100 with a capability to reproduce the sound source. The moving picture service denotes a service which provides the device 100 with a capability to reproduce the moving picture. The health-related service denotes a service providing information about exercise, a medical service such as a diagnosis of a doctor, and/or a service providing or receiving health-related information to/from an insurance company. The travel-related service denotes a service which relates to airports, hotels, or traffic. The e-Book service denotes a service for providing electronic books via the device 100.

Further, the server 1200 may store information about services which may be accessed by the device 100 via a log-in registration. For example, in a case in which the device 100 logs-in to a first sound source providing service provided via a first service providing server 1711, the server 1200 may receive and store account information for logging-in to the first sound source providing service from the device 100.

In addition, the server 1200 may store a service list 1700 which includes a plurality of service types. The server 1200 may receive tag information from the device 100. The server 1200 analyzes the tag information, and may determine a content list to be provided to the device 100 based on the tag information. In particular, the server 1200 may provide an object for providing the device 100 with a capability to display the content list to the device 100, based on the information about the services which are accessible by the device 100 via log-in registration. More particularly, the object for displaying the content list may be realized as a widget or a service gadget. For example, if the account information for the device 100 to log-in to the first sound source providing service provided on the first service providing server 1711 is stored in the server 1200, the server 1200 may provide the device 100 with a service gadget for displaying the content list via the first service providing server 1711. In particular, the server 1200 may transmit the tag information or the content list to the first service providing server 1711.

In FIG. 19, the first service providing server 1711, a second service providing server 1712, and a third service providing server 1713 provide the same kind of service, and are different content providers. In this aspect, the first, second, and third service providing servers 1711, 1712, and 1713 may provide the device 100 with services via different account information.

Further, according to another exemplary embodiment, the device 100 may receive an ID of the external device 110. The external device 110 may match information about the content provided on the external device 110 to the ID of the external device 110, and may upload the information to the server 1200. The device 100 may transmit the ID of the external device 110 to the server 1200. Based on the information about the content, which is matched with the ID of the external device 110, and then received from the device 100, the server 1200 may provide the device 100 with an object for providing the service. For example, the server 1200 may transmit a service gadget for reproducing the sound source that is reproduced through a sound source service in the external device 110 to the device 100.

An exemplary embodiment may be realized in a form of a transitory or non-transitory recording medium which includes a program module which is executable by a computer and a command which is executable by the same computer. A computer-readable medium includes an arbitrary available medium and also includes volatile and non-volatile media and removable and non-removable media. Additionally, a computer-readable medium may include a computer storage medium and a communication medium. The computer storage medium includes volatile and non-volatile media and removable and non-removable media, which are realized through an arbitrary method or technique for storing information on a computer-readable command, a data structure, a program module, or other data. The communication medium typically includes a computer-readable command, a data structure, a program module, or other data of a modulated data signal such as a carrier.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. Therefore, the above-mentioned embodiments are just exemplary in all respects, and the present inventive concept is not limited thereto. For example, each single component may be separated into multiple components which are then separately implemented. Also, separated components may be combined together and implemented as a single component.

Therefore, the scope of the present inventive concept is defined not by the detailed description of the exemplary embodiments but by the appended claims, and all differences within the scope will be construed as being included in the present specification.

What is claimed is:

1. A first device which shares content information with an external device, the first device comprising:
   a wireless transceiver configured to communicate with the external device;
   a controller configured to
      receive a user input for selecting a content category,
      based on the user input, transmit, to the external device, first information related to the content category,
      receive, from the external device, second information related to at least one content corresponding to the first information,
      transmit, to a server, the second information, and
      receive, from the server, an object generated by the server based on the second information, the object comprising a first user interface configured to provide a service relating to the second information; and
   an output component configured to output the received object,
   wherein the controller is further configured to determine, from among a plurality of applications which are installed in the first device, a first application which is usable for reproducing the at least one content, and transmits, to the server, information about the determined first application, and
   wherein the first user interface generated by the server based on the determined first application.

2. The first device of claim 1, wherein the controller is further configured to transmit, to the server, information which relates to the plurality of applications which are installed in the first device and to determine the first application by using the server.

3. The first device of claim 1, wherein the controller is further configured to identify a service account of a user that has an authorization for using a content related to the second information, and the object is usable to provide the service via a log-in registration for accessing the identified service account.

4. The first device of claim 1, wherein the second information includes tag information which relates to a content related to the second information.

5. The first device of claim 1, wherein the wireless transceiver is further configured to receive a packet which includes the second information, wherein the packet is broadcasted from the external device via near field wireless communication, and wherein the controller is further configured to extract the second information from the received packet.

6. The first device of claim 5, wherein the second information is inserted into at least one from among a service set identification (SSD)) and a vendor specific information element (VSIE) that is broadcasted from the external device via near field wireless communication.

7. The first device of claim 1, wherein the controller is further configured to identify a service account of a user that has an authorization for using a content related to the second information, and if the service account of the user that has the authorization for using the content related to the second information does not exist, the controller is further configured to output a second user interface for buying a usage authority via the output component.

8. The first device of claim 1, wherein the first user interface comprises at least one from among an icon, a text, an image, link information which relates to using the service, and description information which relates to functions of the object.

9. A first device comprising:
   a wireless transceiver configured to communicate with an external device;
   a controller configured to
      receive a user input for selecting a content category,
      based on the user input, transmit, to the external device, first information related to the content category,
      receive, from the external device, identification information by which the external device is identifiable,
      transmit the identification information to a server, and
      receive, from the server, an object generated by the server based on the identification information, the object comprising a user interface configured to provide a service relating to the identification information; and
   an output component configured to output the received object,
   wherein the server is configured to match the identification information to at least one content corresponding to the first information and to store the identification information,
   wherein the controller is further configured to determine, from among a plurality of applications which are installed in the first device, a first application which is usable for reproducing the at least one content, and transmit, to the server, information about the determined first application, and
   wherein the user interface is generated by the server based on the determined first application.

10. A first device which shares content information with an external device, the first device comprising:
    a wireless transceiver configured to communicate with the external device;
    a controller configured to
       receive a user input for selecting a content category,
       based on the user input, transmit, to the external device, first information related to the content category,
       receive, from the external device, second information related to at least one content corresponding to the first information, and
       generate an object based on the received second information, the object comprising a user interface configured to provide a service relating to the at least one content; and
    an output component configured to output the generated object
    wherein the controller is further configured to determine, from among a plurality of applications which are installed in the first device, a first application which is usable for reproducing the at least one content, and generate the user interface based on the determined first application.

11. A method for sharing content information which is executable by using a first device in conjunction with an external device, the method comprising:
    receiving, from a user, a user input for selecting a content category;
    based on the user input, transmitting, to the external device, first information related to the content category,
    receiving, from the external device, second information related to at least one content corresponding to the first information, transmitting, to a server, the second information;
receiving, from the server, an object generated by the server based on the second information, the object comprising a first user interface configured to provide a service relating to the second information; and
outputting the received object to the first device,
wherein the method further comprises:
   determining, from among a plurality of applications which are installed in the first device, and based on the second information received from the external device, a first application which is usable for reproducing the at least one content; and
   transmitting, to the server, information about the determined first application, and
wherein the first user interface is generated by the server based on the determined first application.

12. The method of claim 11, wherein the service is provided via the determined first application.

13. The method of claim 11, wherein the transmitting the second information comprises identifying a service account of the user that has an authorization for using a content related to the second information, and the object is usable to provide the service via a log-in registration for accessing the identified service account.

14. The method of claim 11, wherein the second information includes tag information which relates to a content related to the second information.

15. The method of claim 11, wherein the receiving the second information comprises:
   receiving a packet which is broadcasted from the external device via near field wireless communication; and
   extracting the second information from the received packet.

16. The method of claim 15, wherein the second information is inserted into at least one from among a service set identification (SSID) and a vendor specific information element (VSIE) that is broadcasted from the external device via near field wireless communication.

17. The method of claim 11, further comprising:
   identifying a service account of the user that has an authorization for using a content related to the second information; and
   if the service account of the user that has the authorization for using the content related to the second information does not exist, outputting a second user interface for buying a usage authority via an output component.

18. The method of claim 11, wherein the first user interface comprises at least one from among an icon, a text, an image, link information which relates to using the service, and description information which relates to functions of the object.

19. A non-transitory computer-readable recording medium having embodied thereon a program for executing the method of claim 11.

20. A method for sharing content information with an external device by using a first device, the method comprising:
   receiving, from the external device, identification information by which the external device is identifiable;
   receiving, from a user, a user input for selecting a content category;
   based on the user input, transmitting, to the external device, first information related to the content category;
   transmitting, to a server, the identification information;
   receiving, from the server, an object generated by the server based on the identification information, the object comprising a user interface configured to provide a service relating to the second information; and
   outputting the received object via an output component,
wherein the server is configured to match the identification information to at least one content corresponding to the first information and to store the identification information,
wherein the method further comprises determining, from among a plurality of applications which are installed in the first device, a first application which is usable for reproducing the at least one content, and transmitting, to the server, information about the determined first application, and
wherein the user interface is generated by the server based on the determined first application.

21. A method for sharing content information with an external device by using a first device, the method comprising:
   receiving, from a user, a user input for selecting a content category,
   based on the user input, transmitting, to the external device, first information related to the content category,
   receiving, from the external device, second information related to at least one content corresponding to the first information, and
   generating an object based on the received second information, the object comprising a user interface configured being usable to provide a service relating to the at least one content; and
   outputting the generated object,
wherein the generating the object comprises determining, from among a plurality of applications which are installed in the first device, a first application which is usable for reproducing the at least one content, and generating the user interface based on the determined first application.

22. A method for sharing content information between a first device an external device, the method comprising:
   receiving, from a user, a user input for selecting a content category;
   based on the user input, transmitting, to the external device, first information related to the content category,
   receiving, from the external device, second information related to at least one content corresponding to the first information,
   transmitting the received second information to a server; and
   receiving, from the server, an object generated by the server based on the second information, the object comprising a user interface configured to provide a service relating to the at least one content,
wherein the transmitting the second information comprising determining, from among a plurality of applications which are installed in the first device, and based on the second information received from the external device, a first application which is usable for reproducing a content related to the second information, and transmitting, to the server, information which is usable for identifying the determined first application, and
wherein the user interface is generated by the server based on the determined first application.

23. The method of claim 22, further comprising using the received second information to determine, from among a plurality of available applications, an application which is usable for reproducing the at least one content.

24. The method of claim 22, wherein the receiving the second information comprises receiving a packet which is broadcasted by the external device via near field wireless communication, and extracting the second information from the received packet.

25. The method of claim 24, wherein the packet includes at least one from among a service set identification (SSID) and a vendor specific information element (VSIE) from which the second information is extractable.

* * * * *